(12) United States Patent
Seo et al.

(10) Patent No.: US 10,585,935 B2
(45) Date of Patent: Mar. 10, 2020

(54) ELECTRONIC DEVICE AND METHOD FOR PRODUCING VIDEO CONTENT BY USING THE SAME

(71) Applicant: Samsung Electronics Co., Ltd., Suwon-si, Gyeonggi-do (KR)

(72) Inventors: Hyeongchan Seo, Suwon-si (KR); Ilkwon Park, Suwon-si (KR); Sungki Jin, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 93 days.

(21) Appl. No.: 15/672,732

(22) Filed: Aug. 9, 2017

(65) Prior Publication Data

US 2018/0052844 A1 Feb. 22, 2018

(30) Foreign Application Priority Data

Aug. 22, 2016 (KR) .......... 10-2016-0106244

(51) Int. Cl.
| | |
|---|---|
| *G06F 16/432* | (2019.01) |
| *G03B 15/00* | (2006.01) |
| *H04N 5/232* | (2006.01) |
| *G03B 37/02* | (2006.01) |
| *G03B 39/06* | (2006.01) |
| *G06F 15/163* | (2006.01) |

(52) U.S. Cl.
CPC ......... *G06F 16/434* (2019.01); *G03B 15/006* (2013.01); *G03B 37/02* (2013.01); *G03B 39/06* (2013.01); *G06F 15/163* (2013.01); *H04N 5/232* (2013.01); *H04N 5/23258* (2013.01); *H04N 5/23296* (2013.01)

(58) Field of Classification Search
None
See application file for complete search history.

(56) References Cited

U.S. PATENT DOCUMENTS

| | | | | |
|---|---|---|---|---|
| 6,667,592 | B2 * | 12/2003 | Jacobs | G05D 1/0225 |
| | | | | 318/568.12 |
| 9,787,862 | B1 * | 10/2017 | Newman | G06F 16/5866 |
| 2010/0271511 | A1 * | 10/2010 | Ma | H04N 19/597 |
| | | | | 348/239 |
| 2013/0100132 | A1 * | 4/2013 | Katayama | H04N 13/275 |
| | | | | 345/420 |
| 2015/0350614 | A1 * | 12/2015 | Meier | H04N 7/188 |
| | | | | 348/144 |

(Continued)

FOREIGN PATENT DOCUMENTS

KR 10-1550780 B1 9/2015

*Primary Examiner* — Nancy Bitar
(74) *Attorney, Agent, or Firm* — Jefferson IP Law, LLP

(57) ABSTRACT

A method for producing an image content and electronic devices supporting the same are provided. The method includes receiving state information of a second electronic device from the second electronic device and an image photographed by at least one camera installed in the second electronic device, obtaining first data based on at least one of the received state information of the second electronic device or movement information of the second electronic device, obtaining second data based on drive information of the at least one camera, and producing an image content by reflecting the first data and the second data to the received image.

13 Claims, 10 Drawing Sheets

(56) References Cited

U.S. PATENT DOCUMENTS

| | | | |
|---|---|---|---|
| 2016/0046374 A1* | 2/2016 | Kugelmass | G05D 1/101 |
| | | | 701/8 |
| 2016/0187969 A1* | 6/2016 | Larsen | G06F 3/012 |
| | | | 345/156 |
| 2018/0052844 A1* | 2/2018 | Seo | H04N 5/232 |
| 2018/0113507 A1* | 4/2018 | Abdollahi | A42B 3/042 |
| 2019/0004316 A1* | 1/2019 | Baek | G02B 27/01 |

* cited by examiner

FIG. 8
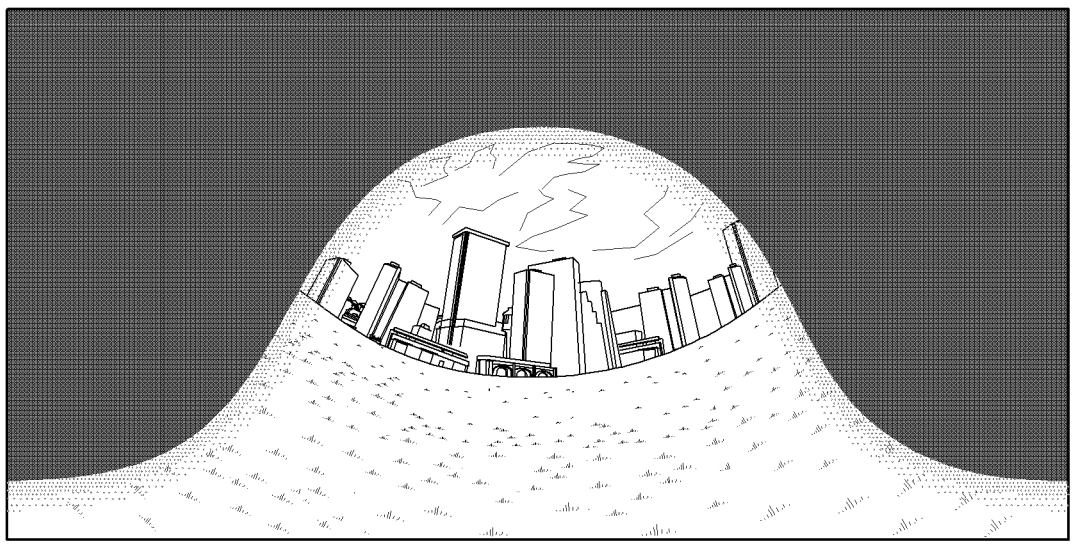
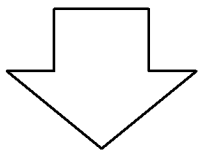
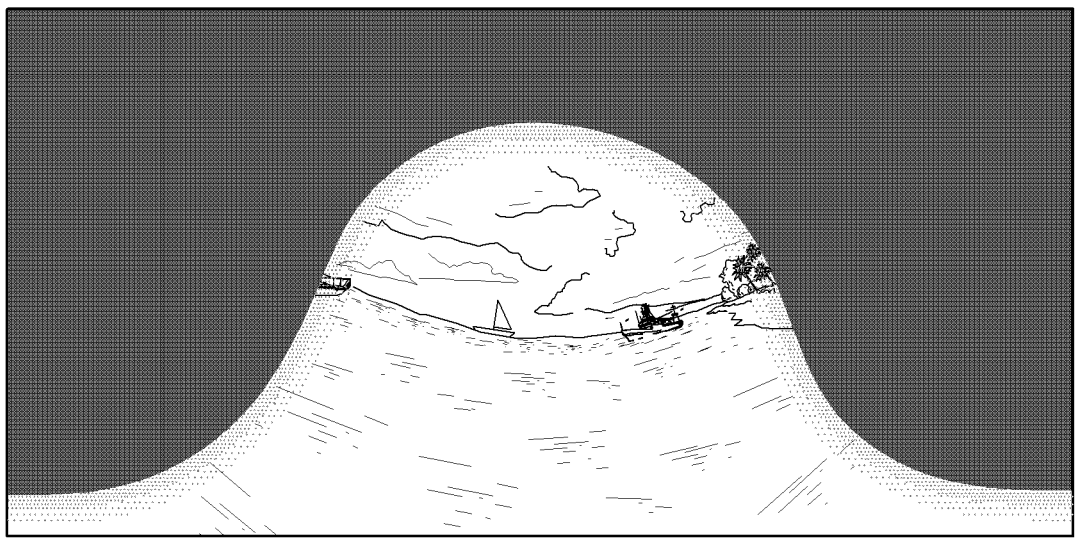

FIG. 9
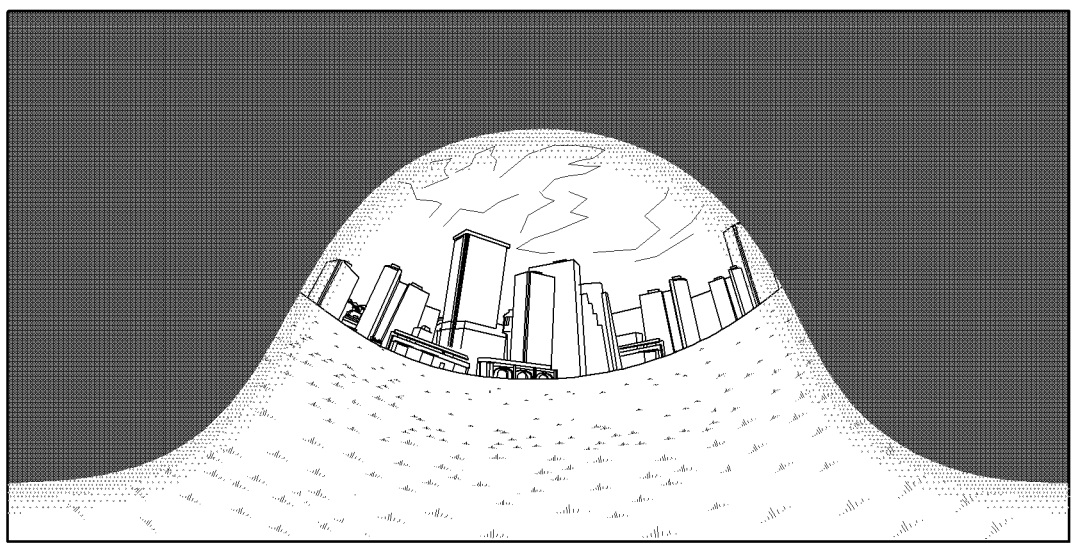
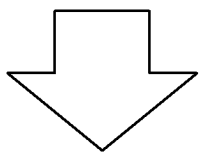
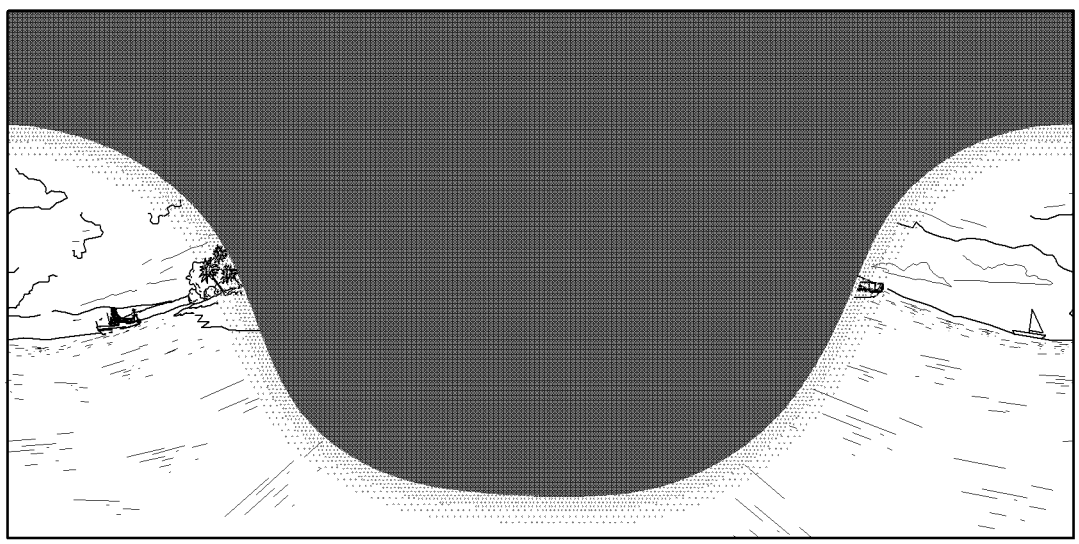

ELECTRONIC DEVICE AND METHOD FOR PRODUCING VIDEO CONTENT BY USING THE SAME

CROSS-REFERENCE TO RELATED APPLICATION(S)

This application claims the benefit under 35 U.S.C. § 119(a) of a Korean patent application filed on Aug. 22, 2016 in the Korean Intellectual Property Office and assigned Serial number 10-2016-0106244, the entire disclosure of which is hereby incorporated by reference.

TECHNICAL FIELD

The present disclosure relates to a method for producing an image content and electronic devices supporting the same.

BACKGROUND

Recently there has been a gradual development of electronic devices as wearable devices that can be worn on a body. The wearable devices may include devices such as a wrist watch and a bracelet that can be worn on a wrist, and devices such as eyeglasses and a head mounted display (HMD) that can be worn on a head. In particular, the HDM can provide a function of displaying an image in front of the eyes by being worn on a user's face and a virtual reality (VR) space which moves a screen according to a user's movement.

In order to provide such a VR space, a virtual reality content is produced with a 360° image, and the 360° image can be produced by using a 360° panorama photographing method or a stitch editing method.

The above information is presented as background information only to assist with an understanding of the present disclosure. No determination has been made, and no assertion is made, as to whether any of the above might be applicable as prior art with regard to the present disclosure.

SUMMARY

In case of providing an image content by using a 360° image photographed from a moving object, a data capacity can increase unnecessarily because unnecessary areas (e.g., sky and ground) are included in a display area.

Further, there is a problem that a focus cannot be easily set to a specific area because the specific area cannot be recognized by a user from a provided image content.

Aspects of the present disclosure are to address at least the above-mentioned problems and/or disadvantages and to provide at least the advantages described below. Accordingly, an aspect of the present disclosure is to provide a method for producing an image content so that a user can enjoy a tangible content by recognizing a direction of an image photographed or being photographed from a moving object.

In accordance with another aspect of the present disclosure, a method for producing an image content in a first electronic device is provided. The method includes receiving state information of a second electronic device from the second electronic device and an image photographed by at least one camera installed in the second electronic device, obtaining first data based on at least one of the received state information of the second electronic device or movement information of the second electronic device, obtaining second data based on drive information of the at least one camera, and producing an image content by reflecting the first data and the second data to the received image.

In accordance with another aspect of the present disclosure, an electronic device is provided. The electronic device includes a communication module configured to communicate with at least one other electronic device, a memory configured to store instructions, and at least one processor configured to connect electrically with the communication module and the memory. The memory, while being executed, can store the instructions so that the at least one processor is further configured to receive state information of a second electronic device from the second electronic device and an image photographed by at least one camera installed in the second electronic device, obtain first data based on at least one of the received state information of the second electronic device or movement information of the second electronic device, obtain second data based on drive information of the at least one camera, and produce an image content by reflecting the first data and the second data to the received image.

In accordance with another aspect of the present disclosure, a method for producing an image content in a second electronic device is provided. The method includes detecting a state of the second electronic device, storing state information of the second electronic device based on the detected state of the second electronic device, storing an image photographed by controlling a camera module in a memory, and transmitting the stored state information of the second electronic device and the image to a first electronic device.

In accordance with another aspect of the present disclosure, an electronic device is provided. The electronic device includes a communication module configured to communicate with at least one other electronic device, a memory configured to store instructions, and at least one processor configured to connect electrically with the communication module and the memory. The memory, while being executed, may comprise instructions so that the at least one processor is configured to detect a state of the second electronic device, store state information of the second electronic device based on the detected state of the second electronic device, store an image photographed by controlling a camera module in a memory, and transmit the stored state information of the second electronic device and the image to a first electronic device.

In accordance with another aspect of the present disclosure, a system for producing an image content is provided. The system includes a first electronic device configured to receive state information of a second electronic device from the second electronic device and an image photographed by at least one camera installed in the second electronic device, obtain first data based on at least one of the received state information of the second electronic device or movement information of the second electronic device, obtain second data based on drive information of the at least one camera, and produce an image content by reflecting the first data and the second data to the received image, and a second electronic device configured to detect a state of the second electronic device, store state information of the second electronic device based on the detected state of the second electronic device, store an image photographed by controlling a camera module in a memory, and transmit the stored state information of the second electronic device and the image to a first electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 8 and 9 illustrate examples of image content produced according to an embodiment of the present disclosure.

Throughout the drawings, like reference numerals will be understood to refer to like parts, components, and structures.

DETAILED DESCRIPTION

Figure 1A:
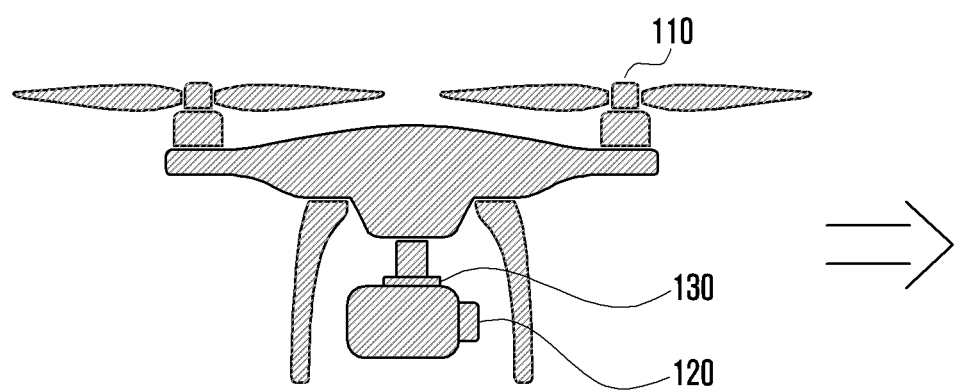
FIGS. 1A and 1B illustrate situations related to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the expressions "have", "may have", "include", and "may include" refer to the existence of a corresponding feature (e.g., a numeral, a function, an operation, or an element such as a component), and do not exclude one or more additional features.

In the present disclosure, the expressions "A or B", "at least one of A and/or B", and "one or more of A and/or B" may include all possible combinations of the items listed. For example, the expressions "A or B", "at least one of A and B", and "at least one of A or B" refer to all of (1) including at least one A, (2) including at least one B, and (3) including all of at least one A and at least one B.

The expressions "a first", "a second", "the first", and "the second" used in various embodiments of the present disclosure may modify various components regardless of the order and/or the importance but is not intended to limit the corresponding components. For example, a first user device and a second user device indicate different user devices but are both user devices. For example, a first element may be referred to as a second element, and similarly, a second element may be referred to as a first element without departing from the scope of the present disclosure.

It should be understood that when an element (e.g., a first element) is referred to as being (operatively or communicatively) "connected," or "coupled," to another element (e.g., a second element), the element may be directly connected or coupled to the other element or another element (e.g., a third element) may be interposer between them. In contrast, it may be understood that when an element (e.g., a first element) is referred to as being "directly connected," or "directly coupled" to another element (e.g., a second element), there is no element (e.g., a third element) interposed between them.

The expression "configured to" used in the present disclosure may be interchangeably used with, for example, the expressions "suitable for", "having the capacity to", "designed to", "adapted to", "made to", and "capable of" according to the situation. The expression "configured to" may not necessarily imply "specifically designed to" in hardware. Alternatively, in some situations, the expression "device configured to" may indicate that the device, together with other devices or components, "is able to". For example, the expression "processor adapted (or configured) to perform A, B, and C" may indicate a dedicated processor (e.g. an embedded processor) for performing only the corresponding operations or a general-purpose processor (e.g., a central processing unit (CPU) or an application processor (AP)) that can perform the corresponding operations by executing one or more software programs stored in a memory device.

The terms used in the present disclosure are only used to describe certain embodiments, but are not intended to limit the present disclosure. As used herein, singular forms may include plural forms as well unless the context clearly indicates otherwise. Unless defined otherwise, all terms used herein, have the same meanings as those commonly understood by a person skilled in the art to which the present disclosure pertains. Terms such as those defined in a generally used dictionary may be interpreted to have the same meanings as the contextual meanings in the relevant field of art, and are not intended to be interpreted to have ideal or excessively formal meanings unless clearly defined in the present disclosure. In some cases, even a term defined in the present disclosure is not intended to be interpreted to exclude various embodiments of the present disclosure.

In the present disclosure, an electronic device may be a device that includes a communication function. For example, an electronic device may be a smart phone, a tablet personal computer (PC), a mobile phone, a video phone, an electronic (e-book) reader, a desktop PC, a laptop PC, a netbook computer, a personal digital assistant (PDA), a portable multimedia player (PMP), a moving picture experts group (MPEG) audio layer 3 (MP3) player, a portable medical device, a digital camera, or a wearable device (e.g., head-mounted device (HMD) such as electronic glasses, electronic clothes, an electronic bracelet, an electronic necklace, an electronic accessory, an electronic tattoo, a smart mirror, or a smart watch).

According to an embodiment of the present disclosure, an electronic device may be a smart home appliance that includes a communication function. For example, an electronic device may be a television (TV), a digital versatile disc (DVD) player, audio equipment, a refrigerator, an air conditioner, a vacuum cleaner, an oven, a microwave, a washing machine, an air cleaner, a set-top box, a TV box (e.g., Samsung HomeSync®, Apple TV®, Google TV™, etc.), a game console, an electronic dictionary, an electronic key, a camcorder, or an electronic picture frame.

According to an embodiment of the present disclosure, an electronic device may include at least one of various medical devices (e.g., various portable medical measuring devices (e.g., a blood glucose monitoring device, a heart rate monitoring device, a blood pressure measuring device, a body temperature measuring device, etc.), a magnetic resonance angiography (MRA) device, a magnetic resonance imaging (MRI) device, a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automated teller machine (ATM) in banks, point of sales (POS) devices in a shop, or an Internet of Things (IoT) device (e.g., a light bulb, various sensors, an electric or gas meter, a sprinkler device, a fire alarm, a thermostat, a streetlamp, a toaster, sporting goods, a hot water tank, a heater, a boiler, etc.).

According to an embodiment of the present disclosure, an electronic device may be furniture or part of a building or construction having a communication function, an electronic board, an electronic signature receiving device, a projector, or various measuring instruments (e.g., a water meter, an electric meter, a gas meter, a wave meter, etc.). An electronic device disclosed herein may be one of the above-mentioned devices or any combination thereof.

Hereinafter, an electronic device according to an embodiment of the present disclosure is described with reference to the accompanying drawings. As used herein, the term "user" may indicate a person who uses an electronic device or a device (e.g., an artificial intelligence electronic device) that uses an electronic device.

Figure 1B:
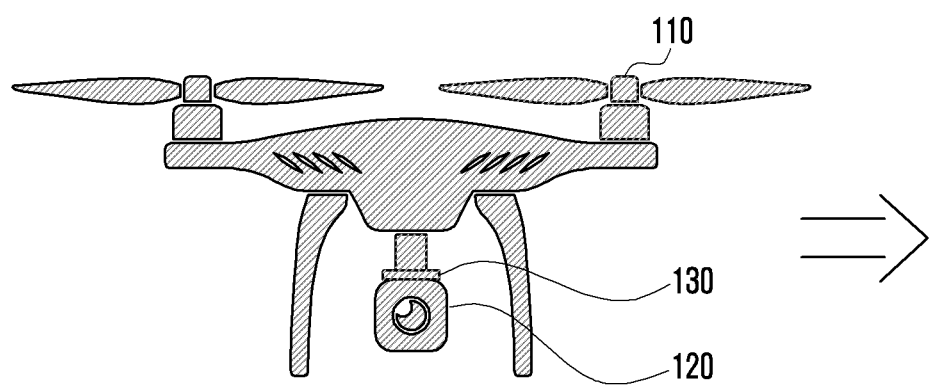

FIGS. 1A and 1B illustrate situations according to an embodiment of the present disclosure.

Referring to FIGS. 1A and 1B, according to various embodiments, a moving object 110 may include at least one camera 120 and a gimbal 130 for connecting the at least one camera 120 and the moving object 110. Although FIGS. 1A and 1B illustrate an embodiment in case that the moving object is a drone, the moving object 110 according to various embodiments of the present disclosure is not limited to the drone.

FIG. 1A illustrates a method of capturing an image by using a camera fixed to a moving object. The image captured by the camera does not reflect a movement of the moving object. According to various embodiments of the present disclosure, a photographing direction of the camera relative to a movement direction of the camera can be identified by a relationship between the movement direction of the moving object and the photographing direction of the camera and can be expressed in a space expressing a tangible content.

FIG. 1B illustrates a case that a movement of the moving object and a movement of the camera are generated at the same time. In this case, an image photographed by the camera does not reflect the movement of the moving object or the movement of the camera. However, according to various embodiments of the present disclosure, a change of a photographing area can be identified based on the movement direction of the moving object, and the change of the photographing area can be expressed in a space expressing a tangible content.

Figure 2:
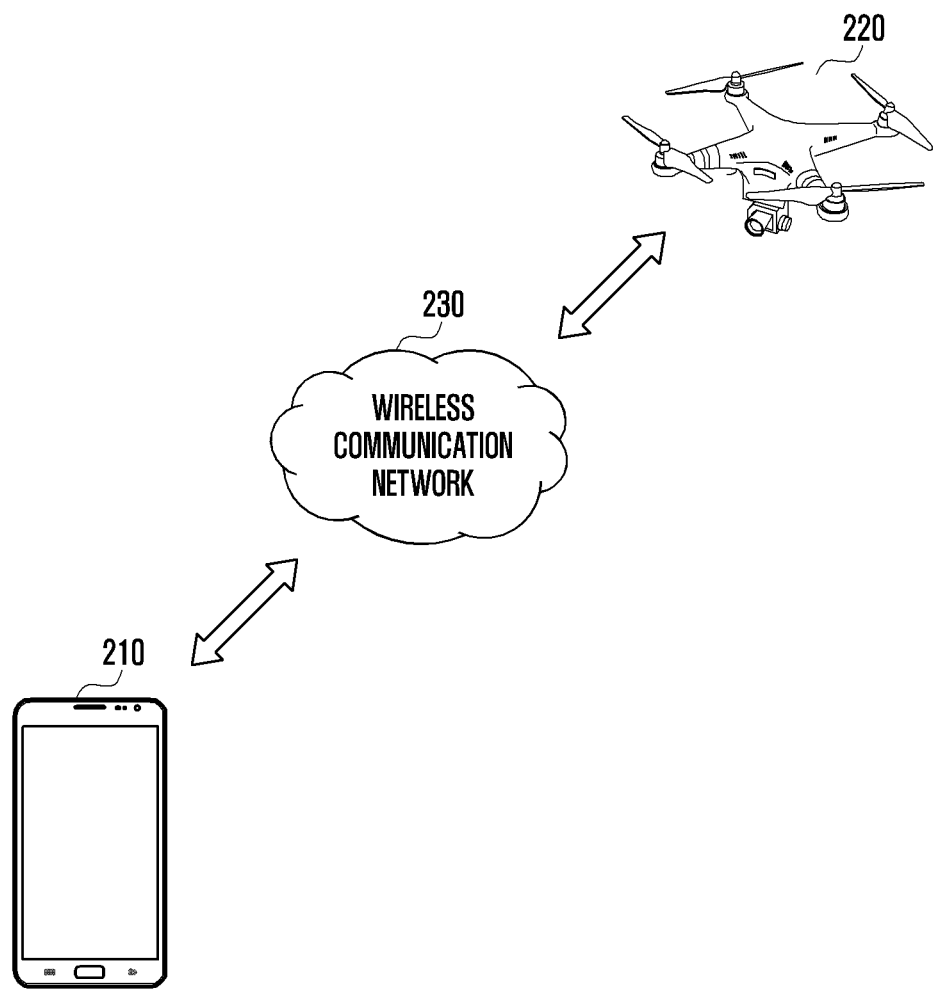
FIG. 2 is a block diagram illustrating a system for producing an image content according to an embodiment of the present disclosure.

FIG. 2 is a block diagram illustrating a system for producing an image content according to an embodiment of the present disclosure.

Referring to FIG. 2, the system according to the present disclosure may include a first electronic device 210, second electronic device 220, and wireless communication network 230. The first electronic device 210 can receive a control command from a user, and transmit the received control command to the second electronic device 220. The second electronic device 220 can control each component included in the second electronic device 220 based on the received control command.

The first electronic device 210 according to various embodiment can be connected to the second electronic device 220 through the wireless communication network 230. According to various embodiments, the wireless communication may include cellular communication using at least one of a long term evolution (LTE), LTE Advance (LTE-A), code division multiple access (CDMA), wideband CDMA (WCDMA), universal mobile telecommunications system (UMTS), wireless broadband (WiBro), or global system for mobile communications (GSM). According to an embodiment, the wireless communication may include at least one of a Wi-Fi, Bluetooth, Bluetooth low energy (BLE), Zigbee, near field communication (NFC), magnetic secure transmission, radio frequency (RF), or body area network (BAN). According to an embodiment, the wireless communication may include a GNSS. The GNSS may be a GPS, Glonass global navigation satellite system (GNSS), Beidou navigation satellite system (Beidou), Galileo, or the European global satellite-based navigation system. In this disclosure, the GPS and the GNSS can be used interchangeably.

Figure 3:
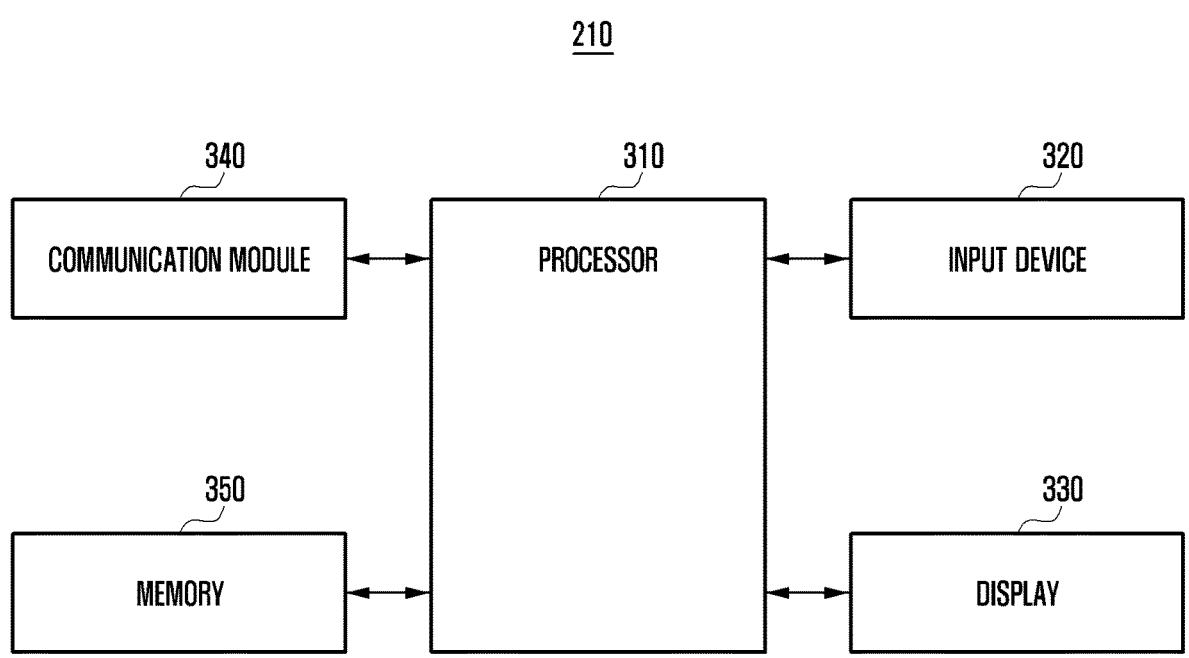
FIG. 3 is a block diagram illustrating a first electronic device according to an embodiment of the present disclosure.

FIG. 3 is a block diagram illustrating a first electronic device according to an embodiment of the present disclosure.

Referring to FIG. 3, the first electronic device 210 may include at least one processor (e.g., Application Processor (AP)) 310, input device 320, display 330, communication module 340, and memory 350.

For example, the processor 310 can control a plurality of hardware/software components connected to the processor by driving an operating system or an application program, and perform various data-processing and calculations. The processor 310 can be configured with a system on chip (SoC). According to an embodiment, the processor 310 may further include a graphic processing unit (GPU) and/or an image signal processor. The processor 310 can process commands and data received from at least one other component (e.g., non-volatile memory) by loading into a volatile memory, and store a resultant data in a non-volatile memory.

The input device 320 may include a touch panel, (digital) pen sensor, key, or ultrasonic input device. The touch panel can use at least one of an electrostatic, pressure-sensitive, infrared, or ultrasonic method. The touch panel may further include a control circuit. The touch panel can provide a user with a tactile response by further including a tactile layer. The (digital) pen sensor may be a part of the touch panel or may include a separate recognition sheet. The key may include a physical button, optical key, or keypad. The ultrasonic input device can detect an ultrasonic wave generated by an input tool through a microphone, and identify data corresponding to the detected ultrasonic wave.

The display 330 may include a liquid crystal display (LCD), light emitting diode (LED) display, organic LED (OLED) Display, microelectromechanical system (MEMS) display, or electronic paper display. The display 330 can display various contents (e.g., a text, image, video, icon, and/or symbol) for a user. The display 330 may include a touch screen, and can receive a touch, gesture, proximity, or hovering input by using an electronic pen or a part of user's body.

The communication module 340 may include a cellular module, Wi-Fi module, Bluetooth module, GNSS module, NFC module, and RF module. The cellular module can provide voice communication, video communication, message service, or internet service. According to an embodiment, the cellular module can perform functions of distinguishing and authenticating the first electronic device in a communication network by using a subscriber identification module (SIM) (e.g., SIM card). According to an embodiment, the cellular module can perform a part of functions provided by the processor 310. According to an embodiment, the cellular module may include a communication processor (CP). According to an embodiment, at least one part (e.g., more than one) of the cellular module, Wi-Fi module, Bluetooth module, GNSS module, or NFC module can be included in an integrated chip (IC) or IC package. The RF module can transmit and receive a communication signal (e.g., RF signal). The RF module may include a transceiver, power amplifier module (PAM), frequency filter, low noise amplifier (LNA), or antenna. According to another embodiment, at least one of the cellular module, Wi-Fi module, Bluetooth module, GNSS module, or NFC module can transmit and receive an RF signal through a separate RF module.

The memory 350 may include a volatile and/or nonvolatile memory. The memory 350 can store commands and data related to at least one other component of the first electronic device 210. According to an embodiment, the memory 350 can store software and/or programs.

Figure 4:
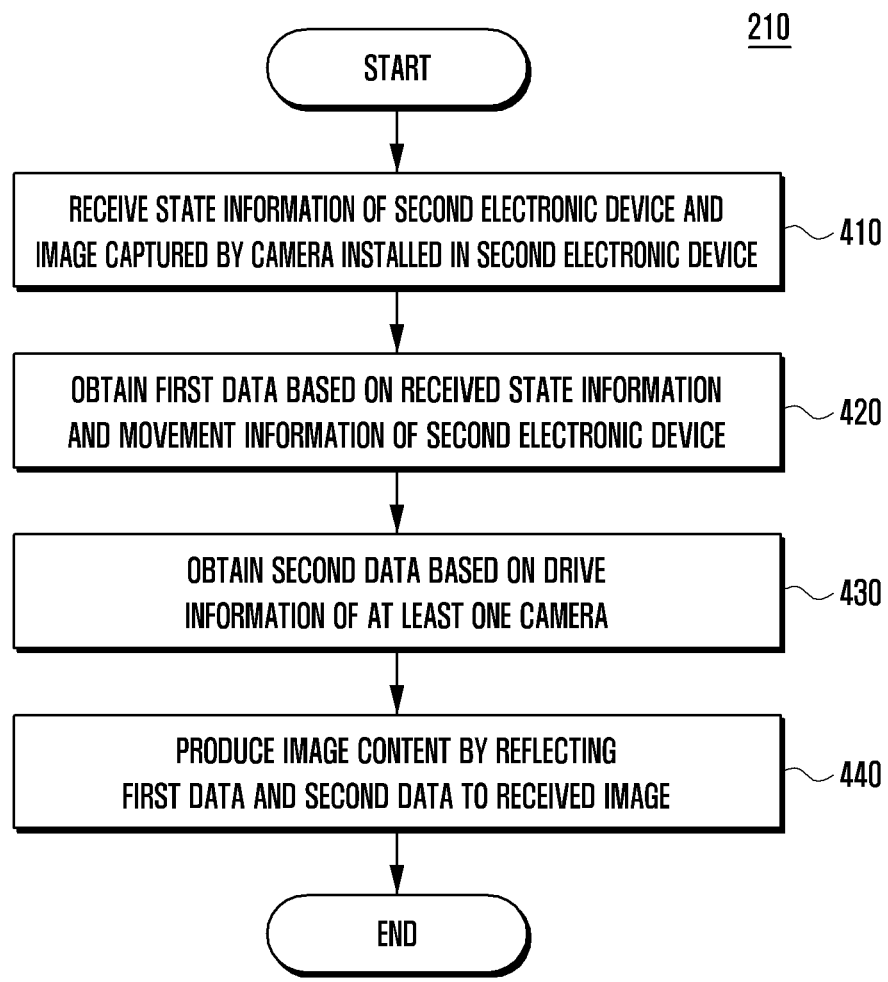
FIG. 4 is a flowchart illustrating a method for producing an image content in a first electronic device according to an embodiment of the present disclosure.

FIG. 4 is a flowchart illustrating a method for producing an image content in a first electronic device 210 according to an embodiment of the present disclosure.

Referring to FIG. 4, at operation 410, the processor 310 of the first electronic device 210 can receive from the second electronic device 220 state information of the second electronic device 220 and an image photographed by at least one camera installed in the second electronic device 220.

According to various embodiments, the state information of the second electronic device 220 may include at least one of acceleration information, rotation angle information, and slope information of the second electronic device 220. For example, the second electronic device 220 can obtain at least one of the acceleration information, rotation angle information, and slope information by controlling a sensor module, and transmit the obtained information to the first electronic device 210.

According to various embodiments, the state information of the second electronic device 220 may include state compensation information of a camera. For example, the second electronic device 220 may include a gimbal in order to maintain a stable camera state while photographing with the camera. The gimbal can compensate the camera state so that stable photographing can be performed without influences being received from surrounding factors of the camera (e.g., vibration, swing, and impact of the second electronic device 220). Such state compensation information of the camera can be received by being included in the state information of the second electronic device 220.

According to various embodiments, the state information of the second electronic device 220 may include evasion flight information of the second electronic device 220. For example, the second electronic device 220 may include an ultrasonic sensor or an infrared sensor. The sensors can be designed to recognize objects located in surroundings while the second electronic device 220 is moving. The second electronic device 220 can control to perform an evasion flight so that the second electronic device 220 can escape from objects existing in a moving direction in order to prevent collisions with the objects. Such evasion flight information of the second electronic device 220 can be received by being included in the state information of the second electronic device 220.

At operation 420, the processor 310 of the first electronic device 210 can obtain first data based on at least one of the received state information of the second electronic device 220 and movement information of the second electronic device 220.

According to various embodiments, the movement information of the second electronic device 220 may include at least one of movement speed information, movement direction information, and movement distance information of the second electronic device 220. The movement information of the second electronic device 220 can be obtained by various methods. For example, the first electronic device 210 can store an input signal as movement data for controlling the movement of the second electronic device 220, and obtain movement information of the second electronic device 220 from the stored movement data. In a further other embodiment, the movement information of the second electronic device 220 can be obtained by analyzing state information of the second electronic device 220. For example, the state information of the second electronic device 220 received from the second electronic device 220 may include acceleration information, rotation angle information, and slope information of the second electronic device 220 according to the time, and movement information of the second electronic device 220 can be obtained by analyzing the received state information of the second electronic device 220.

According to various embodiments, the first data may be data related to the movement of the second electronic device 220 according to the time. The first data may include together movement directions that change according to the movement of the second electronic device 220 and time change information.

At operation 430, the processor 310 of the first electronic device 210 can obtain second data based on drive information of at least one camera.

According to various embodiments, the drive information of the at least one camera may include information for rotating the camera in up, down, right, and left directions by controlling a fan/tilt installed in the second electronic device 220.

According to various embodiments, the second data may be data related to a camera drive according to the time. The second data may include together a photographing direction of the camera that changes according to the control of the camera drive and time information. At operation 440, the first electronic device 210 can produce image content by reflecting the first data and the second data to the received image.

At operation 450, the processor 310 of the first electronic device 210 can produce an image content by reflecting the first data and the second data to the received image.

According to various embodiments, an image content can be produced by synchronizing periodically the received image, first data, and second data. For example, the first data is reflected to an image received according to a movement change of the second electronic device 220 and the second data is reflected to an image received according to a photographing direction change of the camera drive so that a tangible content can be played in a device providing a tangible content space.

In an embodiment, a three-dimensional (3D) tangible image content can be produced by synthesizing images photographed by at least 2 cameras. For example, if an identical photographing area is photographed by at least 2 cameras located at different positions and the at least 2 images obtained from the cameras are overlapped to give a perceptional depth, the images can be used as a 3D tangible image content.

Figure 5:
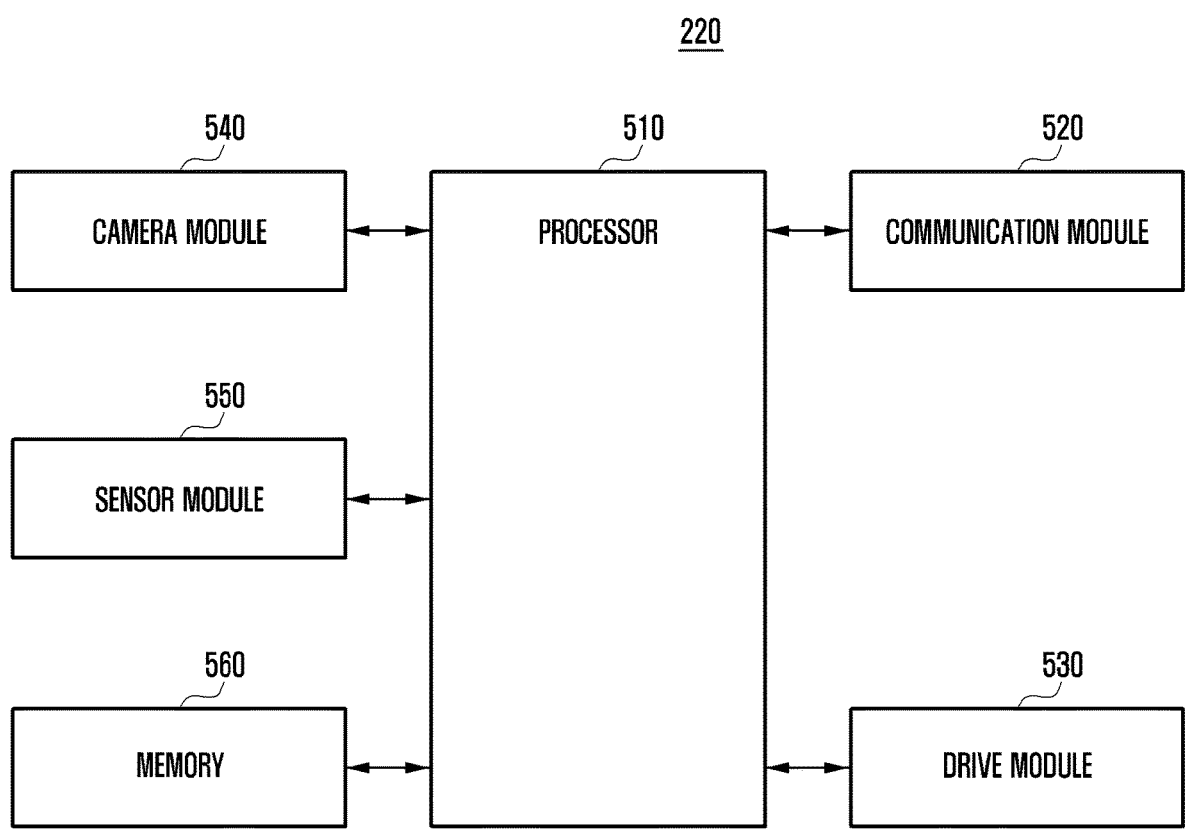
FIG. 5 is a block diagram illustrating a second electronic device according to an embodiment of the present disclosure.

FIG. 5 is a block diagram illustrating a second electronic device according to an embodiment of the present disclosure.

Referring to FIG. 5, the second electronic device 220 may include at least one processor (e.g., AP) 510, communication module 520, drive module 530, camera module 540, sensor module 550, and memory 560.

The processor 510 can receive a control command for the second electronic device 220 from the first electronic device 210, calculate a movement target and a direction according to instructions stored in the memory 560, and generate a control command to transmit to the drive module 530. Further, the processor 510 can receive a control command for the camera module 540 from the first electronic device 210 or control a driving or photographing function of the camera module 540 according to the instructions stored in the memory 560.

The communication module 520 can transmit a control signal to the processor 510 by receiving the signal from the first electronic device 210, and transmit an image photographed by the camera module 540 and state information obtained through the sensor module 550 to the first electronic device 210. The communication module 520 may include a cellular module, Wi-Fi module, Bluetooth module, GNSS module, NFC module, and RF module.

The drive module 530 may include a plurality of motors or propellers. The drive module 530 can receive a control signal from the processor 510, and drive a motor or rotate a propeller so that the second electronic device 220 can move.

The camera module 540 may include at least one camera and a structure for adjusting a fan, tilt, or zoom of the camera. Further, the camera module 540 may include a gimbal. The gimbal can compensate a camera state so that stable photographing can be performed without influences being received from surrounding factors of the camera (e.g., vibration, swing, and impact of the second electronic device). The camera module 540 can receive a control signal for adjusting a fan, tilt, or zoom of camera photographing from the first electronic device, and capture an image by adjusting the fan, tilt, or zoom. Further, the camera module 540 can adjust a fan, tilt, or zoom of camera photographing through the processor 510.

The sensor module 550 may include at least one of an acceleration sensor, gyro sensor, proximity sensor, ultrasonic sensor, and infrared sensor. The sensor module 550 can measure an acceleration and rotation angle of the second electronic device 220, recognize objects located in the surroundings, and transmit the recognition result to the processor 510.

The memory 560 may include a volatile and/or non-volatile memory. The memory 560 can store commands or data related to at least one other component of the second electronic device 220. Further, the memory 560 can store an image photographed by the camera module 540 and state information of the second electronic device 220 obtained from sensor module 550.

Figure 6:
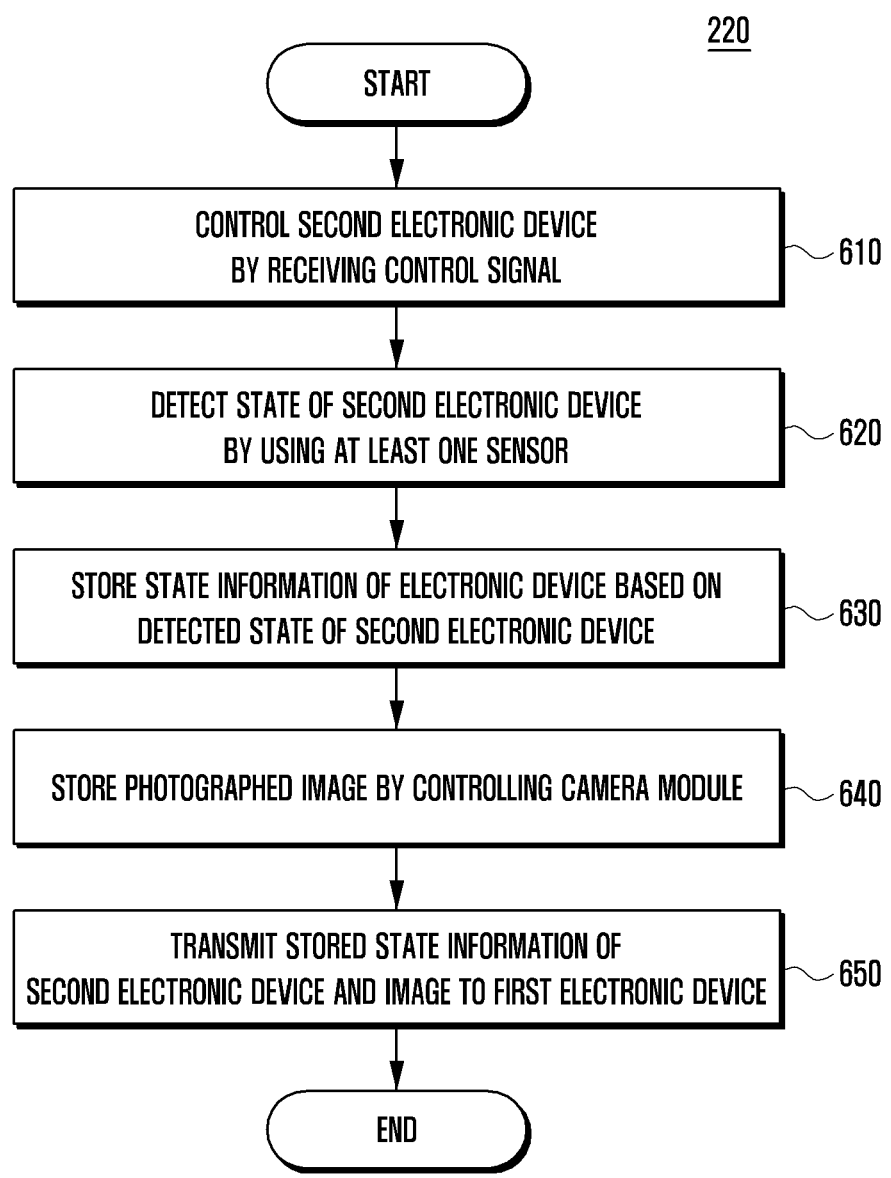
FIG. 6 is a flowchart illustrating a method for producing an image content in a second electronic device according to an embodiment of the present disclosure.

FIG. 6 is a flowchart illustrating a method for producing an image content in a second electronic device according to an embodiment of the present disclosure.

Referring to FIG. 6, the processor 510 of the second electronic device 220 controls the second electronic device 220 by receiving a control signal at operation 610.

According to various embodiments, the control signal can be generated by using instructions stored in the first electronic device 210 or memory 560. The drive module 530 can control the movement of the second electronic device 220 by driving a motor or rotating a propeller according to the control signal. The camera module 540 can control a camera drive and photographing, or control to adjust a camera state.

The processor 510 of the second electronic device 220 detects a state of the electronic device by controlling the sensor module 550 at operation 620.

According to various embodiments, the acceleration sensor or the gyro sensor of the sensor module 550 can detect a state of the second electronic device 220 by measuring an acceleration, rotation angle, and slope of the second electronic device 220.

The processor 510 of the second electronic device 220 stores state information of the second electronic device based on the detected state of the second electronic device 220 at operation 630.

According to various embodiments, the state information of the second electronic device 220 may include at least one of acceleration information, rotation angle information, and slope information detected through the sensor module 550. According to further another embodiment, the state information of the second electronic device 220 may include state compensation information of a camera and/or evasion flight information of the second electronic device 220.

The processor 510 of the second electronic device 220 stores in the memory at operation 640 an image photographed by controlling the camera module 540.

The processor 510 of the second electronic device 220 transmits the stored state information of the second electronic device 220 and image to the first electronic device 210 at operation 650.

Figure 7:
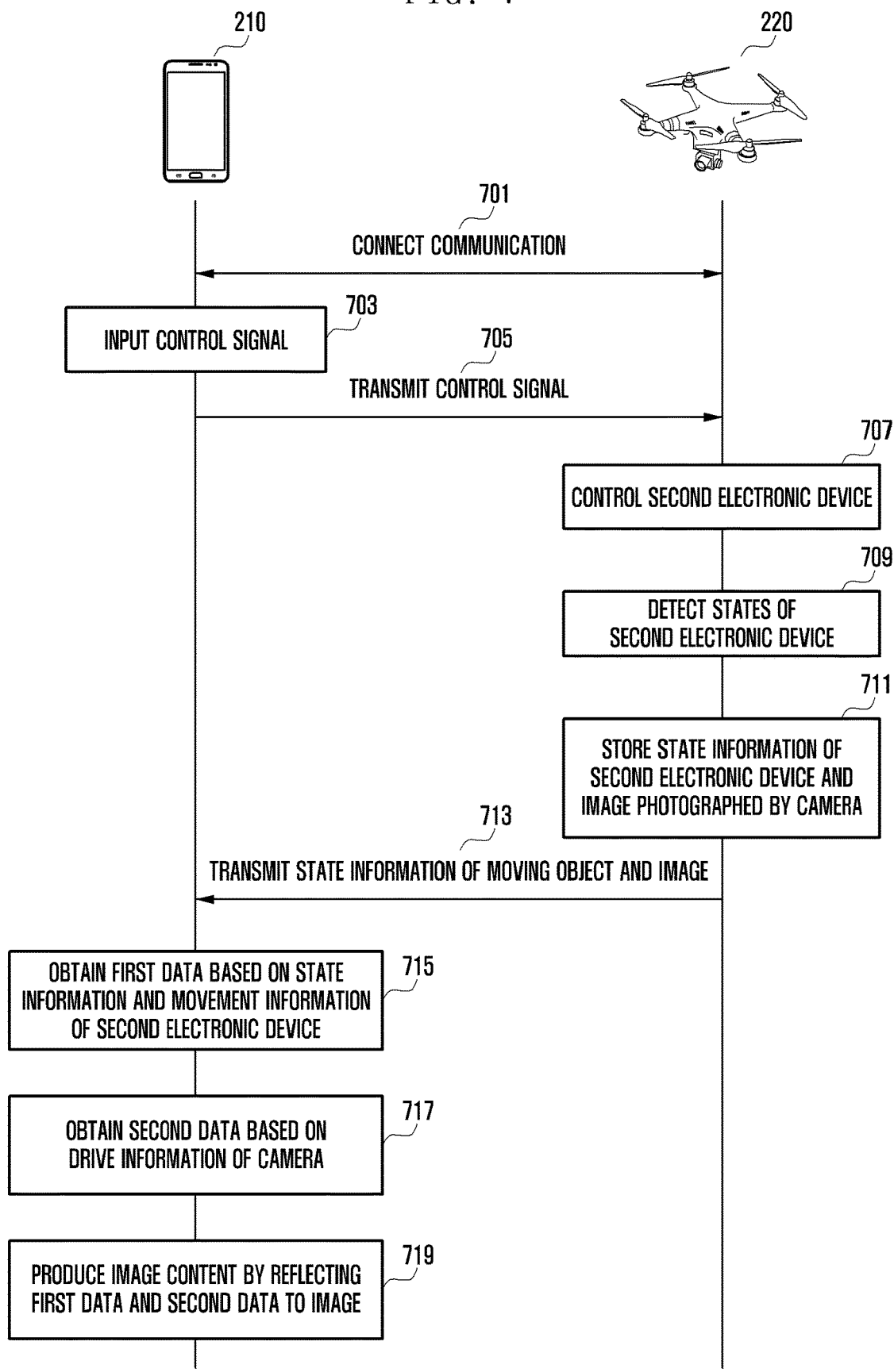
FIG. 7 is a flowchart illustrating an image content producing system according to an embodiment of the present disclosure.

FIG. 7 is a flowchart illustrating an image content producing system according to an embodiment of the present disclosure.

Referring to FIG. 7, the first electronic device 210 is connected to the second electronic device 220 through a wireless communication network at operation 701. Although not shown in the drawings, the first electronic device 210 and the second electronic device 220 may further include an operation for authenticating a user.

The first electronic device 210 receives an input signal for controlling the second electronic device 220 at operation 703. The signal for controlling the second electronic device 220 may be a signal for controlling a movement of the second electronic device 220 or photographing with/driving a camera installed in the second electronic device 220.

The first electronic device 210 transmits the received control signal to the second electronic device 220 at operation 705.

The second electronic device 220 is controlled based on the received control signal at operation 707. For example, the control command may be a command for controlling a movement of the second electronic device 220 or photographing with/driving a camera.

The second electronic device 220 detects a state of the second electronic device 220 at operation 709 by controlling a sensor module. According various embodiments, the acceleration sensor or the gyro sensor can detect a state of the second electronic device 220 by measuring an acceleration, rotation angle, and slope of the second electronic device 220.

The second electronic device 220 stores state information in a memory at operation 711 based on the detected state and an image photographed by the camera according to a control signal.

The second electronic device 220 transmits the stored state information of the second electronic device 220 and image to the first electronic device 210 at operation 713.

The first electronic device 210 obtains first data at operation 715 based on at least one of the received state information of the second electronic device 220 and movement information of the second electronic device 220.

The first electronic device 210 obtains second data based on drive information of at least one camera at operation 717.

The first electronic device 210 produces an image content at operation 719 by reflecting the first data and the second data to the received image.

FIGS. 8 and 9 illustrate examples of image content produced according to various embodiments of the present disclosure.

FIG. 8 illustrates an image content displayed if an object is moving in a state that a camera is fixed as shown in FIG. 1A. The image photographed by a fixed camera may be displayed in a fixed display area. The display area shown in FIG. 8 illustrates a case that a photographing direction of the camera and a movement direction of a moving object are identical. However, if the movement direction of the moving object and the photographing direction of the camera are different, the image can be displayed in a display area other than the display area shown in FIG. 8.

FIG. 9 illustrates an image content displayed if a camera drives while an object is moving as shown in FIG. 1B. If movements of an object and a camera are reflected to a photographed image according to various embodiments of the present disclosure, a display area is not fixed as in FIG. 8, and an image can be displayed by moving on a display area (e.g., 360° display area), which can provide a tangible content according to a camera drive. For example, if a user wears an electronic device providing a virtual reality space and moves along the moving display area, the user can obtain an effect like riding a moving object.

According to various embodiments of the present disclosure, an image content can be provided so that a user can set a focus on a specific area of a photographing object by identifying a direction of an image photographed by a moving object.

According to various embodiments of the present disclosure, a tangible content can be provided so that an unnecessary area is not included in data.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for producing a video content in a first electronic device, the method comprising:
    receiving state information of a second electronic device and an image photographed by at least one camera installed in the second electronic device from the second electronic device;
    obtaining first data based on at least one of the received state information of the second electronic device or movement information of the second electronic device, wherein the movement information of the second electronic device comprises information about movement direction of the second electronic device;
    obtaining second data based on drive information of the at least one camera, wherein the drive information comprises information about photographing direction of the at least one camera; and
    producing an image content by reflecting the first data and the second data to the received image, wherein the image content is capable of changing a display area in which the image is displayed based on a relationship between the movement direction of the second electronic device and the photographing direction of the at least one camera.

2. The method of claim 1, wherein the state information comprises at least one of acceleration information, rotation angle information, or slope information.

3. The method of claim 1, wherein the state information comprises state compensation information of the at least one camera.

4. The method of claim 1, wherein the state information comprises evasion flight information of the second electronic device.

5. The method of claim 1, wherein the movement information of the second electronic device further comprises at least one of movement speed information or movement distance information.

6. The method of claim 1,
    wherein the first data is data related to a movement of the second electronic device according to time, and
    wherein the second data is data related to a camera drive according to the time.

7. An electronic device comprising:
    a communication module;
    at least one processor electrically connected to the communication module; and
    a memory electrically connected to the at least one processor,
    wherein the memory stores instructions that, when executed, cause the at least one processor to:
        receive state information of a second electronic device and an image photographed by at least one camera installed in the second electronic device from the second electronic device,
        obtain first data based on at least one of the received state information of the second electronic device or movement information of the second electronic device, wherein the movement information of the second electronic device comprises information about movement direction of the second electronic device,
        obtain second data based on drive information of the at least one camera, wherein the drive information comprises information about photographing direction of the at least one camera, and produce an image content by reflecting the first data and the second data to the received image, wherein the image content is capable of changing a display area in which the image is displayed based on a relationship between the movement direction of the second electronic device and the photographing direction of the at least one camera.

8. The electronic device of claim 7, wherein the state information comprises at least one of acceleration information, rotation angle information, or slope information.

9. The electronic device of claim 7, wherein the state information comprises state compensation information of the at least one camera.

10. The electronic device of claim 7, wherein the state information comprises evasion flight information of the second electronic device.

11. The electronic device of claim 7, wherein the movement information of the second electronic device comprises at least one of movement speed information or movement distance information.

12. The electronic device of claim 7, wherein the first data is data related to a movement of the second electronic device according to the time, and wherein the second data is data related to a camera drive according to the time.

13. A system for producing an image content, the system comprising:

a first electronic device configured to:

receive state information of a second electronic device and an image photographed by at least one camera installed in the second electronic device from the second electronic device, obtain first data based on at least one of the received state information of the second electronic device or movement information of the second electronic device wherein the movement information of the second electronic device comprises information about movement direction of the second electronic device, obtain second data based on drive information of the at least one camera wherein the drive information comprises information about photographing direction of the at least one camera, and produce an image content by reflecting the first data and the second data to the received image wherein the image content is capable of changing a display area in which the image is displayed based on a relationship between the movement direction of the second electronic device and the photographing direction of the at least one camera; and a second electronic device configured to:

detect a state of the second electronic device, store state information of the second electronic device based on the detected state of the second electronic device, store an image photographed by controlling a camera module in a memory, and transmit the stored state information of the second electronic device and the image to a first electronic device.

* * * * *